United States Patent
Jiang et al.

(10) Patent No.: US 9,990,480 B2
(45) Date of Patent: Jun. 5, 2018

(54) METHOD, APPARATUS AND STORAGE MEDIUM FOR SETTING SMART DEVICE MANAGEMENT ACCOUNT

(71) Applicant: Xiaomi Inc., Beijing (CN)

(72) Inventors: Bo Jiang, Beijing (CN); Lifeng Jiang, Beijing (CN); Shaoxiong Li, Beijing (CN)

(73) Assignee: XIAOMI INC., Beijing (CN)

( * ) Notice: Subject to any disclaimer, the term of this patent is extended or adjusted under 35 U.S.C. 154(b) by 128 days.

(21) Appl. No.: 15/057,828

(22) Filed: Mar. 1, 2016

(65) Prior Publication Data

US 2016/0267260 A1    Sep. 15, 2016

(30) Foreign Application Priority Data

Mar. 11, 2015  (CN) .......................... 2015 1 0105356

(51) Int. Cl.
*H04L 29/06* (2006.01)
*G06F 21/31* (2013.01)
(Continued)

(52) U.S. Cl.
CPC ............ *G06F 21/31* (2013.01); *H04L 63/104* (2013.01); *H04W 4/02* (2013.01); *H04L 63/083* (2013.01);
(Continued)

(58) Field of Classification Search
CPC . H04L 63/104; H04L 63/083; H04L 63/0876; H04W 4/02; H04W 4/08;
(Continued)

(56) References Cited

U.S. PATENT DOCUMENTS 8,325,744 B2    12/2012   Brehm et al.
2004/0177254 A1  9/2004   Havemose
(Continued)

FOREIGN PATENT DOCUMENTS

CN    101547116 A    9/2009
CN    102647291 A    8/2012
(Continued)

OTHER PUBLICATIONS

Extended European Search Report issued in corresponding European Patent Application No. EP 16 15 8283, dated Aug. 7, 2016, 10 pages.

(Continued)

*Primary Examiner* — Michael S McNally
(74) *Attorney, Agent, or Firm* — Arch & Lake LLP

(57) ABSTRACT

A method, an apparatus and storage medium are provided for setting a smart device management account. In the method, the apparatus receives a rights acquisition request at least carrying a login account and first location information of a first smart device. The apparatus acquires a first device group according to the first location information. When determining that the first smart device has management rights on smart devices in the first device group, the apparatus sets the login account of the first smart device as a management account of the first device group. The apparatus sends an authorization message to the first smart device and the smart devices in the first device group.

16 Claims, 6 Drawing Sheets

(51) Int. Cl.
*H04W 4/02* (2018.01)
*H04W 4/08* (2009.01)
*H04W 12/06* (2009.01)
*H04W 12/08* (2009.01)
*H04W 84/12* (2009.01)
*H04W 88/02* (2009.01)
*H04W 88/18* (2009.01)

(52) U.S. Cl.
CPC ........... *H04L 63/0876* (2013.01); *H04W 4/08* (2013.01); *H04W 12/06* (2013.01); *H04W 12/08* (2013.01); *H04W 84/12* (2013.01); *H04W 88/02* (2013.01); *H04W 88/18* (2013.01)

(58) Field of Classification Search
CPC ..... H04W 12/06; H04W 12/08; H04W 84/12; H04W 88/02; H04W 88/12
USPC .............................................................. 726/6
See application file for complete search history.

(56) References Cited

U.S. PATENT DOCUMENTS

| | | | |
|---|---|---|---|
| 2007/0253376 A1 | 11/2007 | Bonta et al. | |
| 2009/0320114 A1 | 12/2009 | Guo et al. | |
| 2011/0143757 A1* | 6/2011 | Oh | H04W 4/08 455/435.2 |
| 2011/0268768 A1* | 11/2011 | Kisilevsky | C07K 14/775 424/400 |
| 2012/0246301 A1* | 9/2012 | Vyrros | A63F 13/335 709/224 |
| 2014/0165165 A1* | 6/2014 | Story, Jr. | H04L 63/08 726/6 |
| 2015/0052621 A1* | 2/2015 | Yi | H04L 63/102 726/31 |
| 2016/0321437 A1* | 11/2016 | Kimmell | H04L 67/42 |

FOREIGN PATENT DOCUMENTS

| | | |
|---|---|---|
| CN | 103457951 A | 12/2013 |
| CN | 103618706 A | 3/2014 |
| CN | 103945330 A | 7/2014 |
| CN | 104079565 A | 10/2014 |
| CN | 104283745 A | 1/2015 |
| CN | 104301437 A | 1/2015 |
| CN | 104424019 A | 3/2015 |
| CN | 104765990 A | 7/2015 |
| EP | 1496650 A1 | 1/2005 |
| JP | 2001067318 A | 3/2001 |
| JP | 2001197558 A | 7/2001 |
| JP | 2005202536 A | 7/2005 |
| JP | 2008065662 A | 3/2008 |
| RU | 2544757 C2 | 3/2015 |
| WO | 0191400 A2 | 11/2001 |
| WO | 2013145303 A1 | 10/2013 |

OTHER PUBLICATIONS

International Search Report issued in corresponding PCT/CN2015/088701, dated Dec. 3, 2015, English translation, 4 pages.
International Search Report corresponding to PCT/CN2015/088701, dated Dec. 3, 2015, (5p).
First Office Action (including English translation) issued in corresponding Chinese Patent Application No. 201510105356.6, dated Jun. 13, 2017, 23 pages.
Communication pursuant to Article 94(3) EPC issued in corresponding European Application No. 16158283.8, dated Aug. 1, 2017, 9 pages.
Notification of Reasons for Refusal (including English translation) issued in corresponding Japanese Patent Application No. 2017-504235, dated May 23, 2017, 6 pages.
Official Action (including English translation) issued in corresponding Russian Patent Application No. 2016102145/08(003032), dated Feb. 21, 2017, 17 pages.

* cited by examiner

METHOD, APPARATUS AND STORAGE MEDIUM FOR SETTING SMART DEVICE MANAGEMENT ACCOUNT

CROSS-REFERENCE TO RELATED APPLICATION

This application claims priority of the Chinese Patent Application No. 201510105356.6 filed on Mar. 11, 2015, which is hereby incorporated herein by reference in its entirety.

TECHNICAL FIELD

The present disclosure relates to the field of terminal technologies, and more particularly, to a method, an apparatus and storage medium for setting a smart device management account.

BACKGROUND

With the development of the technologies, smart devices, such as a smart TV, a smart audio, and a smart lamp and the like, can be seen everywhere in the modern life. In order to improve information security of the smart devices, a management account is normally set up for each smart device. When a user wants to manage a smart device, he needs to log, on the smart device itself, into the management account of the smart device, so as to manage the smart device. If the user wants to manage a plurality of smart devices, he needs to log in to the corresponding management account one by one on the plurality of smart devices.

SUMMARY

The present disclosure provides a method, an apparatus and storage medium for setting a smart device management account.

According to a first aspect of the present disclosure, a method for setting a smart device management account is provided. The method may be implemented by a server. The server receives a rights acquisition request sent from a first smart device, where the rights acquisition request includes a login account and first location information of the first smart device. The server acquires a first device group from a corresponding relationship between location information and device groups according to the first location information. When determining that the first smart device has management rights on smart devices in the first device group, the server sets the login account of the first smart device as a management account of the first device group. The server sends an authorization message to the first smart device and the smart devices in the first device group, where the authorization message is configured to notify that the management account of the first device group is the login account of the first smart device, such that the first smart device and the smart devices in the first device group manage the smart devices in the first device group according to the login account of the first smart device.

According to a second aspect of the present disclosure, a method for setting a smart device management account is provided. The method may be implemented by a smart device. In the method, the smart device sends a rights acquisition request to a server, where the rights acquisition request includes a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group. The smart device receives an authorization message sent from the server, where the authorization message is configured to notify that the management account of the first device group is the login account of the first smart device. The smart device manages the smart devices in the first device group using the login account of the first smart device.

According to a third aspect of the present disclosure, a server is provided. The server includes: a first receiving module, configured to receive a rights acquisition request sent from a first smart device, the rights acquisition request at least carrying a login account and first location information of the first smart device; an acquiring module, configured to acquire a first device group from a corresponding relationship between location information and device groups according to the first location information; a first setting module, configured to set the login account of the first smart device as a management account of the first device group when it is determined that the first smart device has management rights on smart devices in the first device group; and a first sending module, configured to send an authorization message to the first smart device and the smart devices in the first device group, the authorization message being configured to notify that the management account of the first device group is the login account of the first smart device, such that the first smart device and the smart devices in the first device group manage the smart devices in the first device group using the login account of the first smart device.

According to a fourth aspect of the present disclosure, a smart device is provided. The smart device includes: a sending module, configured to send a rights acquisition request to a server, the rights acquisition request at least carrying a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group; a first receiving module, configured to receive an authorization message sent from the server, the authorization message being configured to notify that the management account of the first device group is the login account of the first smart device; and a managing module, configured to manage the smart devices in the first device group using the login account of the first smart device.

According to a fifth aspect of the present disclosure, an apparatus for setting a smart device management account is provided. The apparatus includes: a processor; and a non-transitory computer readable storage for storing instructions executable by the processor. The processor is configured to: receive a rights acquisition request sent from a first smart device, the rights acquisition request at least carrying a login account and first location information of the first smart device; acquire a first device group from a corresponding relationship between location information and device groups according to the first location information; when it is determined that the first smart device has management rights on smart devices in the first device group, set the login account of the first smart device as a management account of the first device group; and send an authorization message to the first smart device and the smart devices in the first device group, the authorization message being configured to notify that the management account of the first device group is the login account of the first smart device, such that the first smart device and the smart devices in the first device group manage the smart devices in the first device group using the login account of the first smart device.

According to a sixth aspect of the present disclosure, an apparatus for setting a smart device management account is provided. The apparatus includes: a processor; and a non-transitory computer readable storage for storing instructions executable by the processor. The processor is configured to: send a rights acquisition request to a server, the rights acquisition request at least carrying a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group; receive an authorization message sent from the server, the authorization message being configured to notify that the management account of the first device group is the login account of the first smart device; and manage the smart devices in the first device group using the login account of the first smart device.

According to a seventh aspect of the present disclosure, a non-transitory computer-readable storage medium is provided. The non-transitory computer-readable storage medium have stored therein instructions that, when executed by one or more processors of an apparatus, cause the apparatus to perform acts including: receiving a rights acquisition request sent from a first smart device, the rights acquisition request at least carrying a login account and first location information of the first smart device; acquiring a first device group from a corresponding relationship between location information and device groups according to the first location information; when it is determined that the first smart device has management rights on smart devices in the first device group, setting the login account of the first smart device as a management account of the first device group; and sending an authorization message to the first smart device and the smart devices in the first device group, the authorization message being configured to notify that the management account of the first device group is the login account of the first smart device, such that the first smart device and the smart devices in the first device group manage the smart devices in the first device group using the login account of the first smart device.

According to an eighth aspect of the present disclosure, a non-transitory computer-readable storage medium is provided. The non-transitory computer-readable storage medium have stored therein instructions that, when executed by one or more processors of an apparatus, cause the apparatus to perform acts including: sending a rights acquisition request to a server, the rights acquisition request at least carrying a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group; receiving an authorization message sent from the server, the authorization message being configured to notify that the management account of the first device group is the login account of the first smart device; and managing the smart devices in the first device group using the login account of the first smart device.

It shall be appreciated that the above general description and the detailed description hereinafter are only illustrative and interpretative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Figure 1:
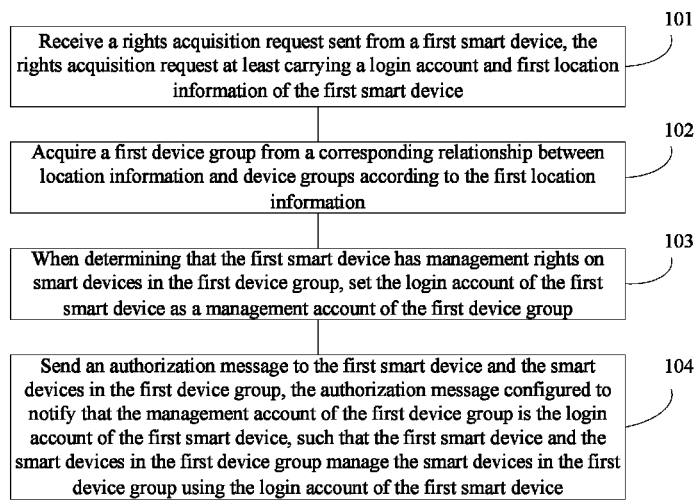
FIG. 1 is a flowchart illustrating a method for setting a smart device management account according to an exemplary embodiment of the present disclosure.

FIG. 1 is a flowchart illustrating a method for setting a smart device management account according to an exemplary embodiment of the present disclosure. As illustrated in FIG. 1, the method for setting a smart device management account may be implemented at least partially by a server, and includes the following steps.

In step 101, the server receives a rights acquisition request sent from a first smart device, where the rights acquisition request at least carries a login account and first location information of the first smart device. The rights acquisition request may be a request to acquire a permission to control one or more devices. For example, the acquisition request may be sent from a smart socket to a smart router, where the smart socket is configured to control one or more smart devices electrically connected to the smart socket. The one or more smart devices may include a smart cooker, a smart fridge, an air purifier, and etc. The login account may include a user name to log onto an application on the smart device or the server so that the user may control the smart device using the application.

In step 102, the server acquires a first device group from a corresponding relationship between location information and device groups according to the first location information. The corresponding relationship may be stored in a data file in the server. Alternatively or additionally, the corresponding relationship may be stored in the first smart device.

In step 103, when determining that the first smart device has management rights on smart devices in the first device group, the server sets the login account of the first smart device as a management account of the first device group. The management rights may include right to turn on the smart device, the right to turn off the smart device, and other manipulations to the smart device. After the login account has been set as the management account of the first device group, the user may gain the management rights by inputting the login account once.

In step 104, the server sends an authorization message to the first smart device and the smart devices in the first device group, where the authorization message is configured to notify that the management account of the first device group is the login account of the first smart device, such that the first smart device and the smart devices in the first device group manage the smart devices in the first device group according to the login account of the first smart device. Thus, the server grants the first smart device the right to manage the other smart devices in the first device group.

According to the method provided in the disclosure, after it is determined that a first smart device has management rights on smart devices in a first device group, a login account of the first smart device is set as a management account of the first device group. Thus, a user may manage a plurality of smart devices in the first device group by logging in to the first smart device using the login account of the first smart device. Thus, one may use a single login account on one smart device to manage multiple devices, such that management on the smart devices is more efficient.

In the disclosure, the rights acquisition request further carries a device identifier of the first smart device.

Upon the acquiring a first device group, the method further includes: determining, according to the device identifier of the first smart device and a prestored corresponding relationship between device identifiers and device groups, whether the first smart device pertains to the first device group; and if the first smart device pertains to the first device group, determining that the first smart device has management rights on the smart devices in the first device group. It may be determined that the first smart device pertains to the first device group when the first smart device is included the first device group.

In the disclosure, the rights acquisition request further carries a device identifier of a second smart device.

Upon the acquiring a first device group, the method further includes: checking whether the first device group includes a device identifier that is the same as the device identifier of the second smart device; and if the first device group includes a device identifier that is the same as the device identifier of the second smart device, determining that the first smart device has management rights on the smart devices in the first device group.

In the disclosure, prior to the acquiring a first device group from a corresponding relationship between location information and device groups, the method further includes: receiving identifier information sent from a plurality of smart devices, the identifier information at least including location information and device identifiers; placing the plurality of smart devices into different device groups according to differences of the location information; and storing a corresponding relationship among device identifiers, location information and device groups.

For example, the location information may include address information, coordinates, or an IP address of the router, etc. The smart devices may be placed into one group when the location information indicate that the smart devices are within a certain distance to a common address or when the smart devices are associated with the same smart socket or the same router.

In the disclosure, upon the sending an authorization message to the first smart device and the smart devices in the first device group, the method further includes:
  receiving a location update message sent from a third smart device, the third smart device being any smart device in the first device group, the location update message being configured to notify that location information of the third smart device is changed from the first location information to second location information; and
  changing, according to the location update message, a device group to which the third smart device pertains from the first device group to a second device group, location information corresponding to the second device group being the second location information.

In the disclosure, upon the changing, according to the location update message, a device group to which the third smart device pertains from the first device group to a second device group, the method further includes:

sending a notification message to the first smart device, the notification message being configured to notify the first smart device to delete the third smart device from the first device group.

In the disclosure, the method further includes:

setting a management password for the management account of the first device group.

The above optional technical solutions may be combined in any form to construct an optional embodiment of the present disclosure, which is not described herein any further.

Figure 2:
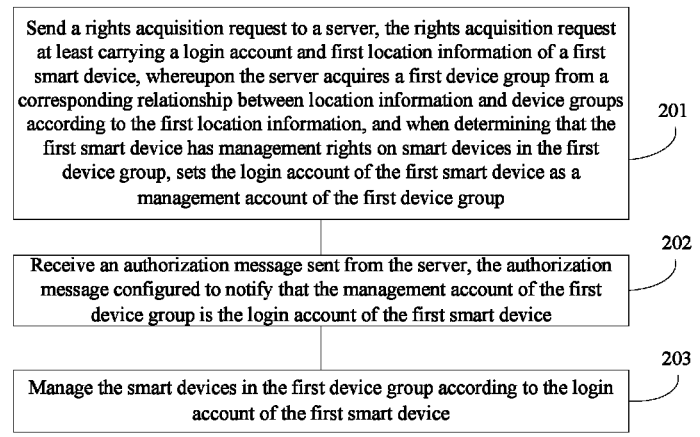
FIG. 2 is a flowchart illustrating a method for setting a smart device management account according to an exemplary embodiment of the present disclosure.

FIG. 2 is a flowchart illustrating a method for setting a smart device management account according to an exemplary embodiment of the present disclosure. As illustrated in FIG. 2, the method for setting a smart device management account may be implemented at least partially by a smart device, and includes the following steps.

In step 201, a rights acquisition request is sent to a server, where the rights acquisition request at least carries a login account and first location information of a first smart device, whereupon the server acquires a first device group from a corresponding relationship between location information and device groups according to the first location information, and when it is determined that the first smart device has management rights on smart devices in the first device group, the login account of the first smart device is set as a management account of the first device group.

In step 202, an authorization message sent from the server is received, where the authorization message is configured to notify that the management account of the first device group is the login account of the first smart device.

In step 203, the smart devices in the first device group are managed according to the login account of the first smart device.

According to the method provided in the disclosure, a rights acquisition request at least carrying a login account and first location information of a first smart device is sent to a server. After the server determines that the first smart device has management rights on smart devices in a first device group, the login account of the first smart device is set as a management account of the first device group and an authorization message sent from the server may be received. Thus, a user may manage a plurality of smart devices in the first device group by logging in to the first smart device via the login account of the first smart device. Accordingly, management on the smart devices becomes more convenient and more efficient.

In the disclosure, upon the managing the smart devices in the first device group according to the login account of the first smart device, the method further includes: receiving a notification message sent from the server, the notification message being sent when the server changes a device group to which a third smart device pertains from the first device group to a second device group, the third smart device being any smart device in the first device group; and deleting the third smart device from the first device group based on the received notification message.

The above optional technical solutions may be combined in any form to construct an optional embodiment of the present disclosure, which is not described herein any further.

Figure 3:
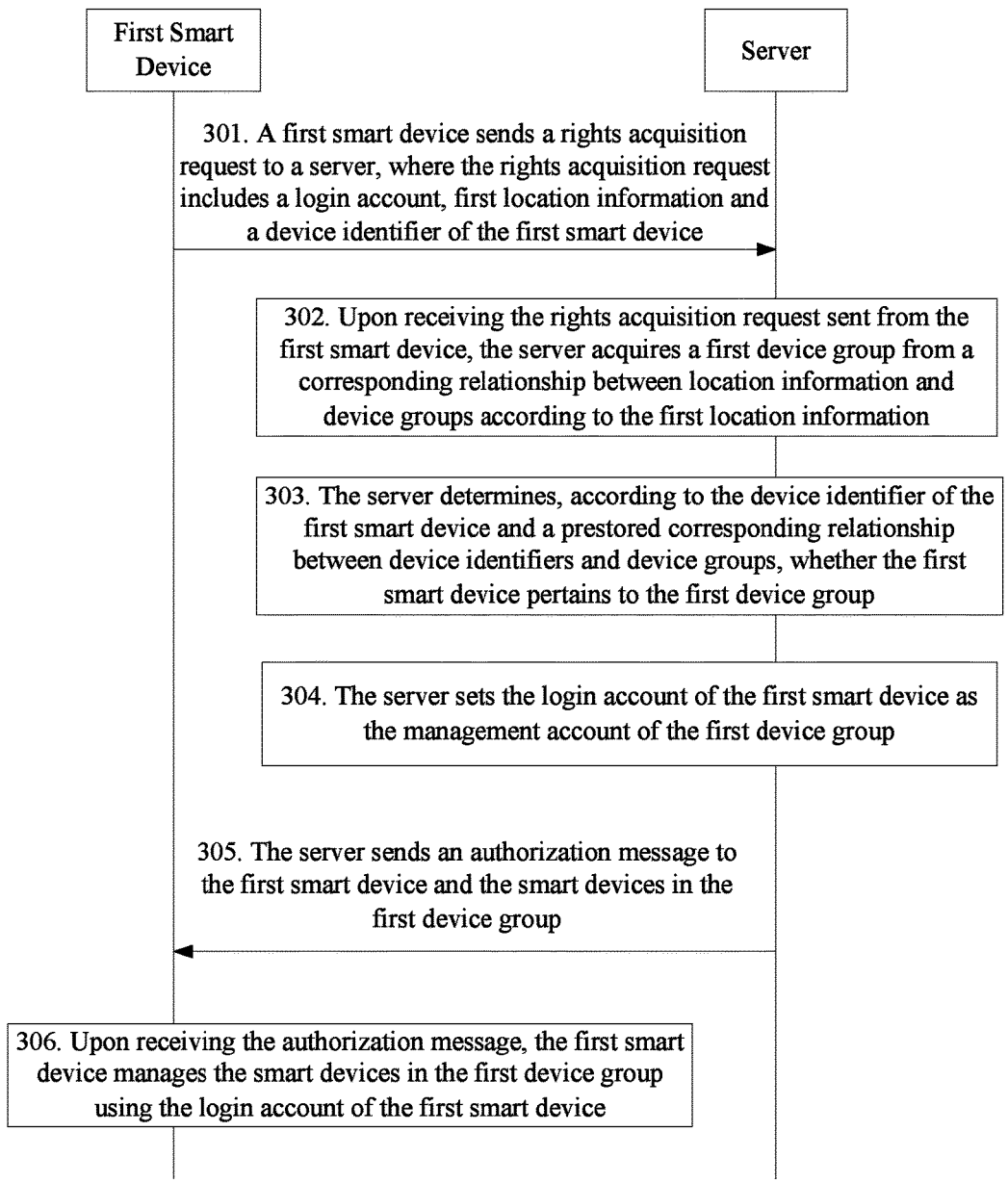
FIG. 3 is a flowchart illustrating a method for setting a smart device management account according to an exemplary embodiment of the present disclosure.

FIG. 3 is a flowchart illustrating a method for setting a smart device management account according to an exemplary embodiment of the present disclosure. As illustrated in FIG. 3, the method for setting a smart device management account may be implemented at least partially by a smart device, where the smart device may be a smart television, a smart refrigerator, a smart washing machine, or the like smart housing device. The method provided in the present disclosure includes the following steps.

In step 301, a first smart device sends a rights acquisition request to a server, where the rights acquisition request at least carries a login account, first location information and a device identifier of the first smart device.

In one or more embodiments, the smart device has the capability of communicating with other devices via radio frequency or via a network. Based on such capability, in a power-on state, the smart device may be connected to a local area network, and communicate with other smart devices in the local area network.

In practical application, the scenarios where the smart device is connected to the local area network include, but not limited to the following ones:

The first scenario: the smart device enables the Wireless-Fidelity (WiFi) function, establishes a connection to a router via the Digital Living Network Alliance (DLAN), WiFi display, airplay, airkan and the like protocols, and is connected to the local area network via the router.

The second scenario: the smart device converts a received general packet radio service (GPRS) or 3G signal into a WiFi signal and sends the WiFi signal; other smart devices receive the WiFi signal sent from the smart device, and communicate with the smart device via the WiFi signal; in this process, a plurality of smart devices receiving the WiFi signal form a local area network.

It should be noted that, for differentiation of the plurality of smart devices in the local network, in this embodiment, the smart device that is currently used by a user in the local area network is referred to as a first smart device. The first smart device may be a smart device newly accessing the local area network, or may be a smart device existent in the local area network. In one or more embodiments, description is given by using a scenario where the first smart device is a smart device newly accessing the local area network. In addition, in this embodiment, the smart device corresponding to another device identifier carried in the rights acquisition request sent from the first smart device to the server is referred to as a second smart device, and any smart device in the first device group is referred to as a third smart device.

In one or more embodiments, when the first smart device is connected to a local area network, the first smart device broadcast a first message in the local area network, where the first message at least carries first identity information of the first smart device. The first identity information may be used by the smart device in the local area network to verify the identity of the first smart device, and the first identity information may be an electronic certificate or the like of the first smart device. Based on the received first message, if the first smart device passes the verification by any smart device in the local area network, it indicates that the first smart device is a trustable device of the smart device. In this case, the smart device sends second identity information for identifying its identity of the smart device to the first smart device. When receiving the second identity information, the first smart device may verify the smart device according to the received second identity information. If the smart device passes the verification by the first smart device, it indicates that the smart device is a trustable device of the first smart device, that is, the smart device and the first smart device are trustable devices for each other.

In one or more embodiments, before the smart device is connected to a local area network, a user may pre-input a device identifier of the trustable device on a setting page of the router. When any smart device is connected to the local area network via a router, the router acquires that the device identifier of the smart device is the device identifier of a trustable device, generates a root electronic certificate, and sends the generated root electronic certificate to the smart device. During this process, if a plurality of smart devices accessing the local area network are trustable smart devices for each other, the router issues the same root electronic certificate to these smart devices. Therefore, based on the above content, when the first smart device verifies the smart device sending the second identity information, the first smart device may match the root electronic certificate carried in the received second identity information with a locally stored root electronic certificate. If the root electronic certificate carried in the second identity information is the same as the locally stored root electronic certificate, it is determined that the smart device passes the verification by the first smart device.

When determining that the first smart device and at least one smart device in the local area network are trustable device for each other, the first smart device may send its device information to the trustable smart devices. In the meantime, the trustable smart devices may also send their device information to the first smart device. The device information at least includes description information and a plurality of configuration options, where a configuration option may include a plurality of configuration parameters. The description information is mainly configured to describe characteristics of a smart device, and may be a device name, a model or the like of the smart device. In one or more embodiments, the description information is not changeable. The configuration option is mainly configured to set functions of a smart device, and different smart devices have different configuration options. Using the scenario where the smart device is a smart television as an example, the configuration option may be a contrast option, a brightness option, a voice option or the like. In one or more embodiments, the configuration option may be changed.

In short, the first smart device may identify trustable smart devices in a local area network and acquires device information of the trustable smart devices. During this process, although the first smart device acquires the device information of the trustable smart devices in the local area network, since each smart device has a unique management account, the login account of the first smart device does not have management rights on other smart devices. To be specific, the user logs in to the first smart device via the login account of the first smart device, and although a management center page of the first smart device displays device information of the trustable smart devices thereof, the user may not manage the trustable smart devices thereof on the first smart device.

To manage the trustable smart devices in the local area network, the first smart device needs to acquire management rights on the trustable smart devices thereof from the server. To this end, the first smart device may sends a rights acquisition request to the server, where the rights acquisition request at least carries a login account, first location information and a device identifier of the first smart device. The login account of the first smart device may be a login account via which the user currently logs in to the first smart device, or may be a login account via which the user has ever logged in to the first smart device. The disclosure sets no limitation to the login account of the first smart device. The first location information is configured to identify a local area network where the first smart device is located. The first local information may be a geographic location where the first smart device is currently located, or may be WiFi hotspot information or the like that is currently used by the first smart device. The device identifier of the first smart device may include an identity of the first smart device, a serial number of the first smart device, or the like.

In step 302, upon receiving the rights acquisition request sent from the first smart device, the server acquires a first device group from a corresponding relationship between location information and device groups according to the first location information.

In the field of communications, each smart device, after connecting to the local area network, may send identifier information to the server, where the identifier information at least includes location information, a device identifier and the like of the smart device. For ease of management on the smart devices, when receiving the identifier information sent from the smart devices, the server may place the smart devices into one or more device groups according to the location information. After grouping the smart device, the smart devices in the same device group have the same location information, and the smart devices from different device groups have different location information. For example, the smart devices in the same local area network may form a device group. In addition, since each of the smart devices in the device group has a device identifier, and the device identifier one-to-one corresponds to the device group, the device identifier, the location information and the device group are subject to a corresponding relationship. For ease of subsequent application, the server may further store the corresponding relationship among the device identifier, the location information and the device group.

It should be noted that, upon storing the corresponding relationship among the device identifier, the location information and the device group, the server receives identifier information of a plurality of smart devices. Although the location information carried in the identifier information is different from location information of the device group stored in the server, IDs or serial numbers of the smart devices partially overlap the IDs or serial numbers of the smart devices in the existing device group, and thus the original IDs or serial numbers may still be used. For example, if the router at a user's home stops working, and the user deploys a new router, since the user accesses a new local area network, the smart devices at the user's home may re-send identifier information thereof to the server. In this case, the server may still place the original smart devices at the user's home into the original device group. In addition, after the server places one smart device into a device group according to location information of the smart device, unless the location information of the smart device is changed or the user deletes the smart device from the device group, regardless of whether the smart device is in an online state or not, the device group to which the smart device belongs to may not change.

Based on the stored corresponding relationship among the device identifier, the location information, and the device group, when receiving the rights acquisition request sent from the first smart device, the server may acquire, according to first location information, the first device group corresponding to the first location information.

In step 303, the server determines, according to the device identifier of the first smart device and a prestored corresponding relationship between device identifiers and device groups, whether the first smart device pertains to the first device group. If the first smart device pertains to the first device group, step 304 is performed; and otherwise, the rights acquisition request sent from the first smart device is ignored.

To improve the information security of the smart devices in the first device group and prevent other non-trustable smart devices, which connect to the local area network where the first device group is located, from managing the smart devices in the first device group, upon receiving the rights acquisition request sent from the first smart device and acquiring the corresponding first device group according to the first location information, the server may further determine whether the first smart device pertains to the first device group. If the first smart device pertains to the first device group, it indicates that the first smart device and the smart devices in the first device group are trustable smart devices for each other. In this case, the server may assign management rights to the first smart device to manage the smart devices in the first device group.

If the first smart device does not pertain to the first device group, it indicates that the first smart device and the smart devices in the first device group are non-trustable smart devices for each other. In this case, the server may ignore the rights acquisition request sent from the first smart device, or may refuse the rights acquisition request sent from the first smart device and return a refuse message to the first smart device, for example, such a message as "the device does not have sufficiently high security and cannot manage the devices in the device group." Nevertheless, the server may also employ other manners, which is not limited in this disclosure.

In one or more embodiments, since the corresponding relationship among the device identifier, the location information and the device group is prestored in the server, upon receiving the rights acquisition request sent from the first smart device, the server may determine, according to the device identifier of the first smart device and the prestored corresponding relationship among the device identifier, the location information and the device group, whether the first smart device pertains to the first smart device. For example, assume that the prestored device identifiers of the first device group are A, B and C, if the device identifier of the first smart device is A, it may be determined that the first smart device pertains to the first device group; and if the device identifier of the first smart device is D, it may be determined that the first smart device does not pertain to the first device group.

In step 304, the server sets the login account of the first smart device as the management account of the first device group.

Since the smart devices in the first device group and the first smart device are trustable smart devices for each other, managing the smart devices in the first device group by using the login account of the first smart device achieves higher security. Therefore, the server may set the login account of the first smart device as the management account of the first device group.

In step 305, the server sends an authorization message to the first smart device and the smart devices in the first device group.

When the server sets the login account of the first smart device as the management account of the first device group, to cause the first smart device and the smart devices in the device group to acquire the management account of the first device group, the server may further send an authorization message to the first smart device and the smart devices in the first device group, where the authorization message is configured to notify that the management account of the first device group is the login account of the first smart device.

In step 306, upon receiving the authorization message, the first smart device manages the smart devices in the first device group according to the login account of the first smart device.

Upon receiving the authorization message, the first smart device may manage the smart devices in the first device group according to the login account of the first smart device. For example, the first smart device may change a configuration option or the like of any smart device in the first device group on the management center page thereof. Nevertheless, another smart device in the first device group may also manage any smart device or devices in the first device group via the login account of the first smart device.

In one or more embodiments, after the first smart device manages the smart devices in the first device group via the login account of the first smart device, the device identifiers of the smart devices may be displayed in the management center page. The device identifiers may be displayed in a plurality of forms, for example, a text form, a voice form, or a graph form or the like.

In one or more embodiments, when location information of a third smart device is changed from the first location information to second location information, the third smart device may further send a location update message to the server. Upon receiving the location update message, the server may place the third smart device from the first device group into a second device group, where location information corresponding to the second device group is the second location information. In this case, the smart devices in the first device group do not have management rights. If the smart device still allows the smart devices in the first device group to manage the smart device, when a confirmation dialog box is displayed on a display interface of the smart device, it is detected that a user selects the confirmation option, and in this case, the smart device continues allowing the smart device in the first device group to manage the smart device. In addition, to ensure that the other smart devices in the first device group acquire the location information change of the third smart device, upon receiving the location update message sent from the third smart device, the server further sends the received location update message to the first smart device, such that the first smart device deletes the third smart device from the first device group on the management center page.

It should be noted that, to improve information security of the smart devices in the device group, a management password is set for the management account of each smart device. When any smart device needs to manage the other smart devices via the management account, the correct management password needs to be entered.

According to the method provided in the disclosure, it is determined, according to a device identifier of a first smart housing device and a prestored corresponding relationship between device identifiers and device groups, that the first smart housing device pertains to a first device group, and when it is determined that the first smart housing device has management rights on smart housing devices in the first device group, a login account of the first smart housing device is set as a management account of the first device group, and a user may manage a plurality of smart housing devices in the first device group by logging in to a first smart housing device via a login account of the first smart device. In this way, management on the smart housing devices is simpler and more efficient. In addition, the server may further send an authorization message to the first smart housing device and the smart housing devices in the first device group, such that the first smart housing device and the smart housing devices in the first device group timely acquire the management account of the first device group. As such, timeliness in the management is further enhanced.

Figure 4:
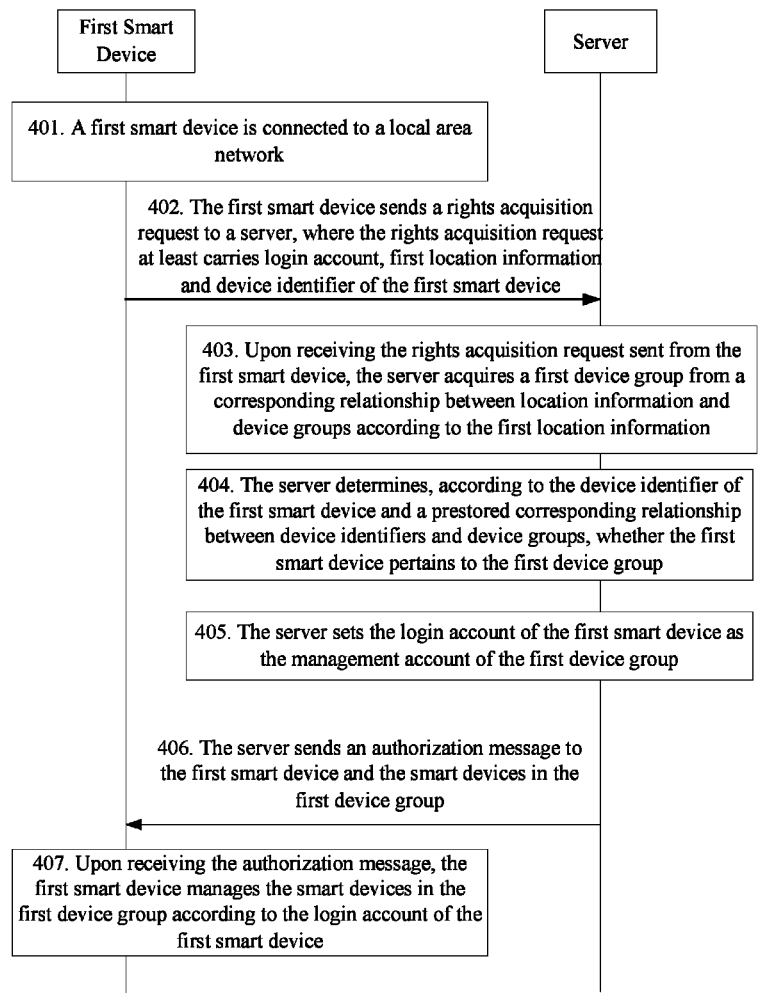
FIG. 4 is a flowchart illustrating a method for setting a smart device management account according to an exemplary embodiment of the present disclosure.

FIG. 4 is a flowchart illustrating a method for setting a smart device management account according to an exemplary embodiment of the present disclosure. As illustrated in FIG. 4, the method for setting a smart device management account may be implemented at least partially by a smart device, where the smart device may be a mobile phone, a tablet computer or the like device having strong mobility. The method provided in the present disclosure may include the following steps.

In step 401, a first smart device is connected to a local area network.

In one or more embodiments, the smart device has the capability of communicating with other devices via radio frequency or via a network. Based on such capability, in a power-on state, the smart device may be connected to a local area network, and communicate with other smart devices in the local area network.

In practical application, the scenarios where the smart device may be connected to the local area network include, but no limited to the following ones:

The first scenario: the smart device enables the WiFi function, establishes a connection to a router via the DLAN, WiFi display, airplay, airkan and the like protocols, and is connected to the local area network via the router.

The second scenario: the smart device converts a received GPRS or 3G signal into a WiFi signal and sends the WiFi signal; other smart devices receive the WiFi signal sent from the smart device, and communicate with the smart device via the WiFi signal; in this process, a plurality of smart devices receiving the WiFi signal form a local area network.

It should be noted that, for differentiation of the plurality of smart devices in the local network, in this embodiment, the smart device that is currently used by a user in the local area network is referred to as a first smart device. The first smart device may be a smart device newly accessing the local area network, or may be a smart device existent in the local area network. In one or more embodiments, description is given by using a scenario where the first smart device is a smart device newly accessing the local area network. The second smart device is a smart device corresponding to the device identifier carried in the rights acquisition request that is sent from the first smart device to the server.

In step 402, the first smart device sends a rights acquisition request to a server, where the rights acquisition request at least carries a login account, first location information and a device identifier of the first smart device.

To manage the smart devices in the local area network, upon accessing the local area network, the first smart device may send a rights acquisition request to the server, where the rights acquisition request at least carries the login account, the first location information and the device identifier of the first smart device.

The login account of the first smart device may be a login account via which the user currently logs in to the first smart device, or may be a login account via which the user has ever logged in to the first smart device. This embodiment sets no limitation to the login account of the first smart device. The first location information is configured to identify a local area network where the first smart device is located. The first local information may be a geographic location where the first smart device is currently located, or may be WiFi hotspot information or the like that is currently used by the first smart device. The device identifier of the first smart device may be an identity of the first smart device, a serial number of the first smart device, or the like.

In step 403, upon receiving the rights acquisition request sent from the first smart device, the server acquires a first device group from a corresponding relationship between location information and device groups according to the first location information.

Here, each smart device, after connecting to the local area network, may send identifier information to the server, where the identifier information at least includes location information, a device identifier and the like of the smart device. For ease of management on the smart devices, when receiving the identifier information sent from the smart devices, the server may place the smart devices into different device groups according to differences of the location information. After the grouping of the smart device, the smart devices in the same device group have the same location information, and the smart devices from different device groups have different location information. To be specific, the smart devices in the same local area network form a device group. In addition, since each of the smart devices in the device group has a device identifier, and the device identifier one-to-one corresponds to the device group, the device identifier, the location information and the device group are subject to a corresponding relationship. For ease of subsequent application, the server may further store the corresponding relationship among the device identifier, the location information and the device group.

Based on the stored corresponding relationship among the device identifier, the location information and the device group, when receiving the rights acquisition request sent from the first smart device, the server may acquire, according to first location information, the first device group corresponding to the first location information from the corresponding relationship between the location information and the device group.

In step 404, when determining that the first smart device has management rights on smart devices in the first device group, the server sets the login account of the first smart device as a management account of the first device group.

In one or more embodiments, the server may determine that the first smart device has management rights on the smart devices in the first device group in the following three cases:

In the first case, when the first smart device is connected to the local area network where the first smart device is located, the first smart device sends a rights acquisition request to the server; and if the server determines that the device group to which the first smart device pertains is the first device group, the server determines that the first smart device has management rights on the smart devices in the first device group.

In the second case, the first smart device acquires a device identifier of a second smart device, and carries the device identifier of the second smart device in the rights acquisition request and sends the request to the server; the server checks whether the first device group includes a device identifier that is the same as the device identifier of the second smart device; if the first device group includes a device identifier that is the same as the device identifier of the second smart device, the server determines that the first smart device has management rights on the smart devices in the first device group. The manners in which the first smart device may acquire the device identifier of the second device include, but not limited to: acquiring the device identifier of the second smart device by processing the device identifier on the management center page of the second smart device.

It should be noted that, to improve the information security, the first smart device sends a rights acquisition request to the server according to the acquired device identifier of the second smart device, thereby achieving specific timeliness. When the first smart device sends a rights acquisition request to the server within a specific time period, the server may process the rights acquisition request. When the first smart device sends a rights acquisition request to the server out of a specific time period, the server may not process the rights acquisition request. The timeliness of the rights acquisition request is specifically reflected by the fact that the device identifier of the second smart device carries time information, or the server performs timing on the rights acquisition request sent from the first smart device using the time when the rights acquisition request is received as a start point.

In the third case, after the first smart device is connected to the local area network where the first smart device is located and becomes trustable smart devices with the smart devices in the first device group for each other at the device discovery stage, the server receives a rights acquisition request sent from the first smart device, and determines, according to location information carried in the rights acquisition request, that a device group to which the first smart device pertains is the first device group, and that the first smart device and the smart devices in the first device group are trustable smart devices for each other; and in this case, the server determines that the first smart device has management rights on the smart devices in the first device group.

In step 405, the server sets the login account of the first smart device as the management account of the first device group.

Since the smart devices in the first device group and the first smart device are trustable smart devices for each other, managing the smart devices in the first device group by using the login account of the first smart device achieves higher security. Therefore, the server may set the login account of the first smart device as the management account of the first device group.

In step 406, the server sends an authorization message to the first smart device and the smart devices in the first device group.

When the server sets the login account of the first smart device as the management account of the first device group, to cause the first smart device and the smart devices in the device group to acquire the management account of the first device group, the server may further send an authorization message to the first smart device and the smart devices in the first device group, where the authorization message is configured to notify that the management account of the first device group is the login account of the first smart device.

In step 407, upon receiving the authorization message, the first smart device manages the smart devices in the first device group according to the login account of the first smart device.

Upon receiving the authorization message, the first smart device may manage the smart devices in the first device group according to the login account of the first smart device. For example, the first smart device may change a configuration option or the like of any smart device in the first device group on the management center page thereof. Nevertheless, another smart device in the first device group may also manage any smart device or devices in the first device group via the login account of the first smart device.

According to the method provided in the present disclosure, after it is determined that a mobile terminal has management rights on smart housing devices in a first device group, a login account of the mobile terminal is set as a management account of the first device group, such that a user may manage a plurality of smart housing devices in the first device group by logging in to a mobile terminal via a login account of the mobile terminal. In this way, management on the smart housing devices is simpler and more efficient. In addition, a server may further send an authorization message to the mobile terminal and the smart housing devices in the first device group, such that the mobile terminal and the smart housing devices in the first device group timely acquire the management account of the first device group. As such, timeliness in the management is further enhanced.

Figure 5:
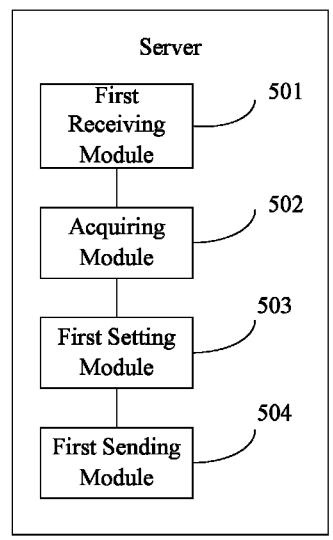
FIG. 5 is a schematic structural diagram illustrating a server according to an exemplary embodiment of the present disclosure.

FIG. 5 is a schematic structural diagram illustrating a server according to an exemplary embodiment of the present disclosure. Referring to FIG. 5, the server includes: a first receiving module 501, an acquiring module 502, a first setting module 503, and a first sending module 504.

The first receiving module 501 is configured to receive a rights acquisition request sent from a first smart device, where the rights acquisition request at least carries a login account and first location information of the first smart device.

The acquiring module 502 is configured to acquire a first device group from a corresponding relationship between location information and device groups according to the first location information.

The first setting module 503 is configured to set the login account of the first smart device as a management account of the first device group when it is determined that the first smart device has management rights on smart devices in the first device group.

The first sending module 504 is configured to send an authorization message to the first smart device and the smart devices in the first device group, where the authorization message is configured to notify that the management account of the first device group is the login account of the first smart device, such that the first smart device and the smart devices in the first device group manage the smart devices in the first device group according to the login account of the first smart device.

In the disclosure, the rights acquisition request further carries a device identifier of the first smart device.

The server further includes: a determining module and a first determining module.

The determining module is configured to determine, according to the device identifier of the first smart device and a prestored corresponding relationship between device identifiers and device groups, whether the first smart device pertains to the first device group.

The first determining module is configured to, if the first smart device pertains to the first device group, determine that the first smart device has management rights on the smart devices in the first device group.

In the disclosure, the rights acquisition request further carries a device identifier of the second smart device.

The server further includes: a checking module and a second determining module.

The checking module is configured to check whether the first device group includes a device identifier that is the same as the device identifier of the second smart device.

The second determining module is configured to, if the first device group includes a device identifier that is the same as the device identifier of the second smart device, determine that the first smart device has management rights on the smart devices in the first device group.

In the disclosure, the server further includes: a second receiving module, a grouping module, and a storage module.

The second receiving module is configured to receive device information sent from a plurality of smart devices, where the device information at least includes location information and device identifiers.

The grouping module is configured to place the plurality of smart devices into different device groups according to differences of the location information.

The storage module is configured to store a corresponding relationship among device identifiers, location information and device groups.

In the disclosure, the server further includes: a third receiving module and a changing module.

The third receiving module is configured to receive a location update message sent from a third smart device, the third smart device being any smart device in the first device group, where the location update message is configured to notify that location information of the third smart device is changed from the first location information to second location information.

The changing module is configured to change, according to the location update message, a device group to which the third smart device pertains from the first device group to a second device group, where location information corresponding to the second device group is the second location information.

In the disclosure, the server further includes: a second sending module.

The second sending module is configured to send a notification message to the first smart device, where the notification message is configured to notify the first smart device to delete the third smart device from the first device group.

In the disclosure, the server further includes: a second setting module.

The second setting module is configured to set a management password for the management account of the first device group.

According to the server provided in the present disclosure, after it is determined that a first smart device has management rights on smart devices in a first device group, a login account of the first smart device is set as a management account of the first device group, and a user may manage a plurality of smart devices in the first device group by logging in to the first smart device via the login account of the first smart device, such that management on the smart devices is simpler and more efficient.

With respect to the apparatuses in the above embodiments, the specific implementations of operations executed by various modules thereof have been described in detail in the embodiments illustrating the methods, which are not described herein any further.

Figure 6:
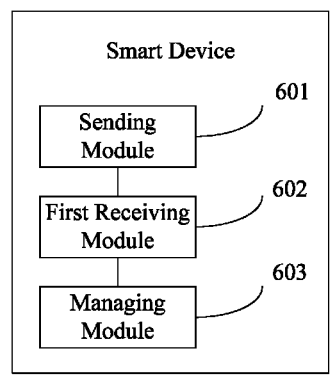
FIG. 6 is a schematic structural diagram illustrating a smart device according to an exemplary embodiment of the present disclosure.

FIG. 6 is a schematic structural diagram illustrating a smart device according to an exemplary embodiment of the present disclosure. As illustrated in FIG. 6, the smart device includes: a sending module 601, a first receiving module 602, and a managing module 603.

The sending module 601 is configured to send a rights acquisition request to a server, where the rights acquisition request at least carries a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group.

The first receiving module 602 is configured to receive an authorization message sent from the server, where the authorization message is configured to notify that the management account of the first device group is the login account of the first smart device.

The managing module 603 is configured to manage the smart devices in the first device group according to the login account of the first smart device.

In the disclosure, the smart device further includes: a second receiving module and a deleting module.

The second receiving module is configured to receive a notification message sent from the server, where the notification message is sent when the server changes a device group to which a third smart device pertains from the first device group to a second device group, and the third smart device is any smart device in the first device group.

The deleting module is configured to delete the third smart device from the first device group based on the received notification message.

According to the smart device provided in the present disclosure, a rights acquisition request at least carrying a login account and first location information of a first smart device is sent to a server. After the server determines that the first smart device has management rights on smart devices in a first device group, the login account of the first smart device is set as a management account of the first device group and an authorization message sent from the server is received. Thus, a user may manage a plurality of smart devices in the first device group by logging in to the first smart device via the login account of the first smart device. In this way, management on the smart devices is simpler and more efficient.

Figure 7:
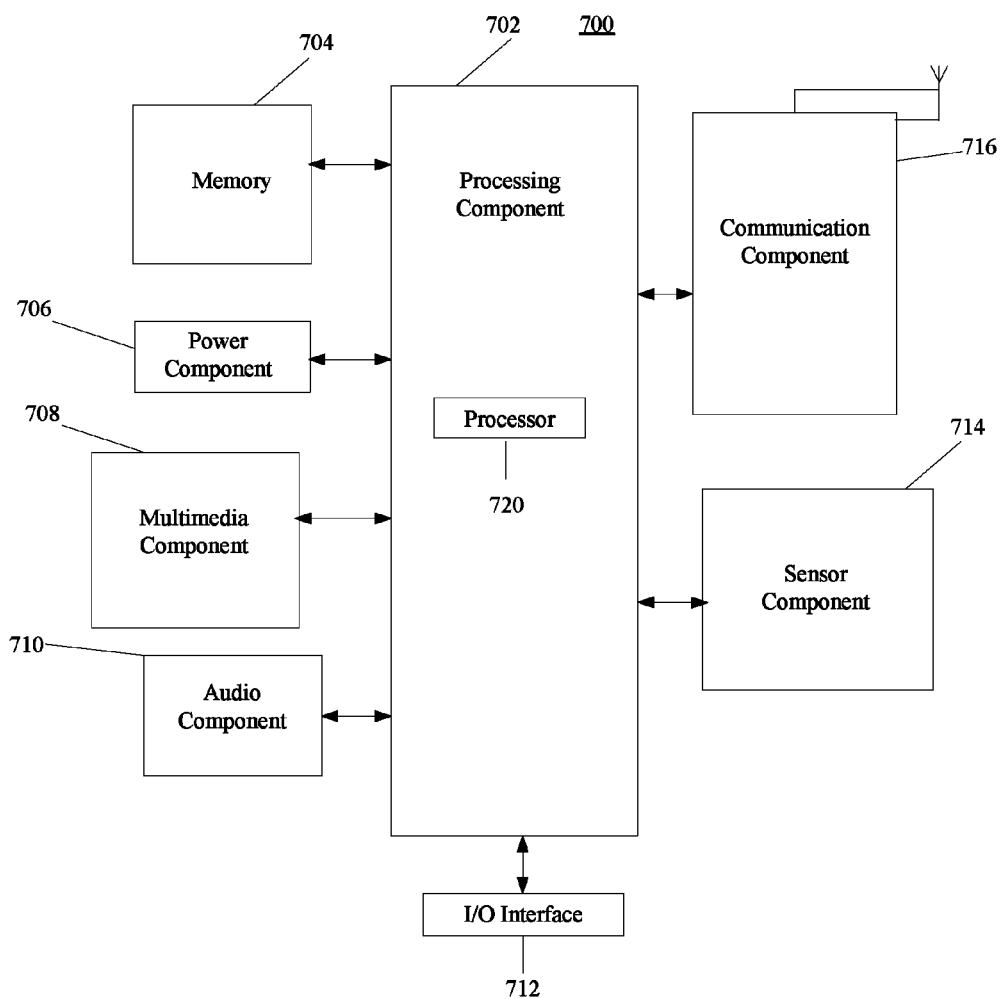
FIG. 7 is a block diagram illustrating an apparatus for setting a smart device management account according to an exemplary embodiment of the present disclosure.

FIG. 7 is a block diagram illustrating an apparatus 700 for setting a smart device management account according to an exemplary embodiment of the present disclosure. For example, the apparatus 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or a part of the steps in the above-described methods. In addition, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support the operations of the apparatus 700. Examples of such data include instructions for any application or method operated on the apparatus 700, contact data, phonebook data, messages, pictures, videos, and the like. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. Each module, such as discussed with respect to FIG. 6, may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The power component 706 provides power to various components of the apparatus 700. The power component 706 may include a power management system, one or more power supplies, and other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the apparatus 700 is in an operation mode, such as a call mode, a recording mode, or a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and a peripheral interface module, such as a keyboard, a click wheel, a button, or the like. The buttons may include, but are not limited to, a home button, a volume button, a starting button, and a locking button.

The sensor component 714 includes one or more sensors to provide status assessments of various aspects of the apparatus 700. For example, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communications, wired or wirelessly, between the apparatus 700 and other devices. The apparatus 700 may access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 704, executable by the processor 720 in the apparatus 700, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

A non-transitory computer-readable storage medium is provided. When instructions stored in the storage medium are executed by a processor of a mobile terminal, the mobile terminal is caused to perform acts for setting a smart device management account. The acts include: sending a rights acquisition request to a server, the rights acquisition request at least carrying a login account and first location information of a first smart device, whereupon the server acquires a first device group from a corresponding relationship between location information and device groups according to the first location information, and when it is determined that the first smart device has management rights on smart devices in the first device group, sets the login account of the first smart device as a management account of the first device group; receiving an authorization message sent from the server, the authorization message being configured to notify that the management account of the first device group is the login account of the first smart device; and managing the smart devices in the first device group according to the login account of the first smart device.

Additionally or alternatively, upon the managing the smart devices in the first device group according to the login account of the first smart device, the acts further include: receiving a notification message sent from the server, the notification message being sent when the server changes a device group to which a third smart device pertains from the first device group to a second device group, the third smart device being any smart device in the first device group; and deleting the third smart device from the first device group based on the received notification message.

According to the non-transitory computer-readable storage medium provided in the present disclosure, a rights acquisition request at least carrying a login account and first location information of a first smart device is sent to a server, and after the server determines that the first smart device has management rights on smart devices in a first device group, the login account of the first smart device is set as a management account of the first device group and an authorization message sent from the server is received, such that a user may manage a plurality of smart devices in the first device group by logging in to the first smart device via the login account of the first smart device. In this way, management on the smart devices is simpler and more efficient.

Figure 8:
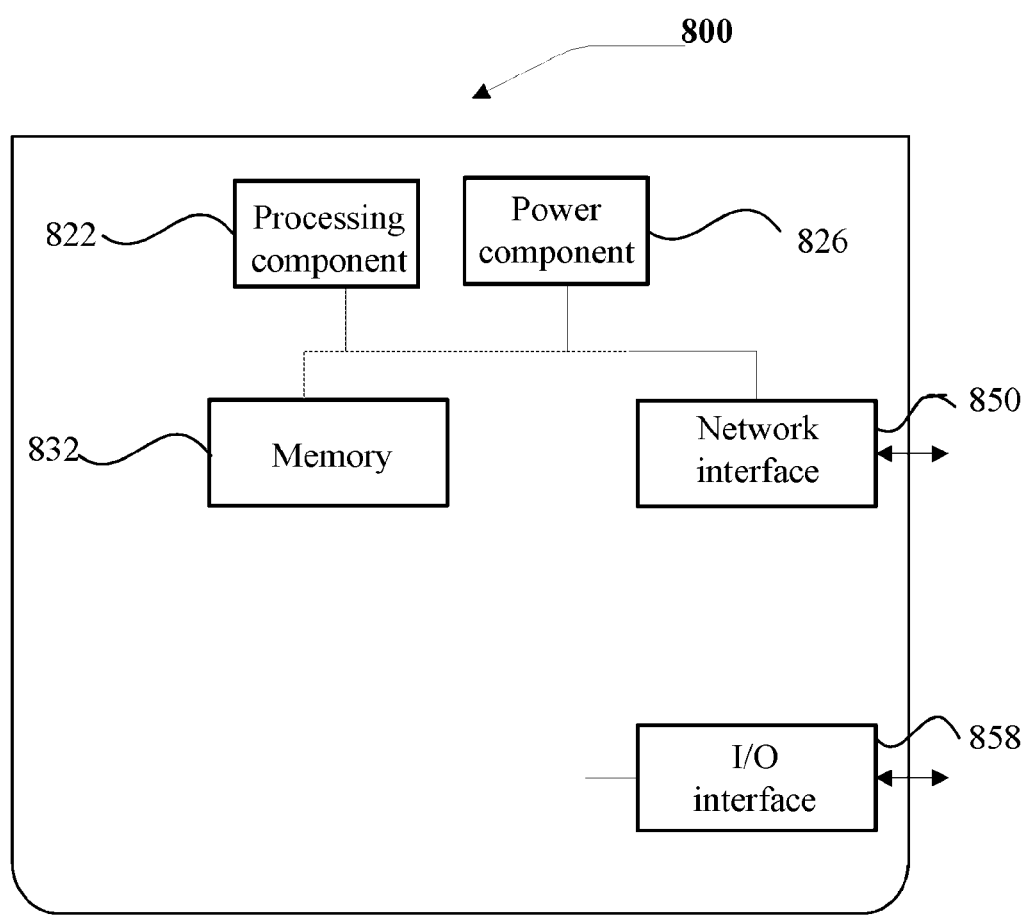
FIG. 8 is a block diagram illustrating an apparatus for setting a smart device management account according to an exemplary embodiment of the present disclosure.

FIG. 8 is a block diagram illustrating an apparatus 800 for setting a smart device management account according to an exemplary embodiment of the present disclosure. For example, the apparatus 800 may be provided as a server. Referring to FIG. 8, the apparatus 800 includes: a processing circuitry 822, which further includes one or more processors; and memory resources represented by a memory 832, configured to store instructions executable by the processor 822, for example, applications. The applications stored in the memory 832 may include one or more than one module each corresponding to a group of instructions. In addition, the processor 822 is configured to execute the instructions, to perform the above acts for setting a smart device management account, including:
  receiving a rights acquisition request sent from a first smart device, the rights acquisition request at least carrying a login account and first location information of the first smart device;
  acquiring a first device group from a corresponding relationship between location information and device groups according to the first location information;
  when it is determined that the first smart device has management rights on smart devices in the first device group, setting the login account of the first smart device as a management account of the first device group; and
  sending an authorization message to the first smart device and the smart devices in the first device group, the authorization message being configured to notify that the management account of the first device group is the login account of the first smart device, such that the first smart device and the smart devices in the first device group manage the smart devices in the first device group according to the login account of the first smart device.

In the disclosure, the rights acquisition request further carries a device identifier of the first smart device.

Upon the acquiring a first device group, the method further includes: determining, according to the device identifier of the first smart device and a prestored corresponding relationship between device identifiers and device groups, whether the first smart device pertains to the first device group; and if the first smart device pertains to the first device group, determining that the first smart device has management rights on the smart devices in the first device group.

Each module, such as discussed with respect to FIG. 5, may take the form of a packaged functional hardware unit designed for use with other components, a portion of a program code (e.g., software or firmware) executable by one or more processors in the processor 822 or the processing circuitry that usually performs a particular function of related functions, or a self-contained hardware or software component that interfaces with a larger system, for example.

In the disclosure, the rights acquisition request further carries a device identifier of a second smart device.

Upon the acquiring a first device group, the method further includes:
  checking whether the first device group includes a device identifier that is the same as the device identifier of the second smart device; and
  if the first device group includes a device identifier that is the same as the device identifier of the second smart device, determining that the first smart device has management rights on the smart devices in the first device group.

In the disclosure, prior to the acquiring a first device group from a corresponding relationship between location information and device groups, the method further includes:
  receiving identifier information sent from a plurality of smart devices, the identifier information at least including location information and device identifiers;
  placing the plurality of smart devices into different device groups according to differences of the location information; and
  storing a corresponding relationship among device identifiers, location information and device groups.

In the disclosure, upon the sending an authorization message to the first smart device and the smart devices in the first device group, the method further includes:
  receiving a location update message sent from a third smart device, the third smart device being any smart device in the first device group, the location update message being configured to notify that location information of the third smart device is changed from the first location information to second location information; and
  changing, according to the location update message, a device group to which the third smart device pertains from the first device group to a second device group, location information corresponding to the second device group being the second location information.

In the disclosure, upon the changing, according to the location update message, a device group to which the third smart device pertains from the first device group to a second device group, the method may further include: sending a notification message to the first smart device, the notification message being configured to notify the first smart device to delete the third smart device from the first device group.

In the disclosure, the method may further include: setting a management password for the management account of the first device group.

The apparatus 800 may further include: a power component 826, configured to perform power management in the apparatus 800; a wired or wireless network interface 850, configured to connect the apparatus 800 to the network; and an input/output (I/O) interface 858. The apparatus 800 may operate an operating system stored in the memory 832, for example, Windows Server™, Mac OS X™, Unix™, Linux™, FreeBSD™, or the like.

According to the apparatus provided in the present disclosure, after it is determined that a first smart device has management rights on smart devices in a first device group, a login account of the first smart device is set as a management account of the first device group, and a user may manage a plurality of smart devices in the first device group by logging in to the first smart device via the login account of the first smart device, such that management on the smart devices is simpler and more efficient.

The solutions provided in the present disclosure may achieve the following beneficial effects. After it is determined that a first smart device has management rights on smart devices in a first device group, a login account of the first smart device is set as a management account of the first device group, and a user may manage a plurality of smart devices in the first device group by logging in to the first smart device via the login account of the first smart device, such that management on the smart devices is simpler and more efficient.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method, comprising:
   receiving a rights acquisition request sent from a first smart device, the rights acquisition request at least carrying a login account and first location information of the first smart device;
   acquiring a first device group from a corresponding relationship between location information and device groups according to the first location information;
   when determining that the first smart device has management rights on smart devices in the first device group, setting the login account of the first smart device as a management account of the first device group; and
   sending an authorization message to the first smart device and the smart devices in the first device group, the authorization message being configured to notify that the management account of the first device group is the login account of the first smart device, such that the first smart device and the smart devices in the first device group manage the smart devices in the first device group using the login account of the first smart device,
   wherein the rights acquisition request further carries a device identifier of the first smart device; and upon acquiring the first device group, the method further comprises:
   determining, according to the device identifier of the first smart device and a prestored corresponding relationship between device identifiers and device groups, whether the first smart device pertains to the first device group; and
   when the first smart device pertains to the first device group, determining that the first smart device has management rights on the smart devices in the first device group.

2. The method according to claim 1, wherein the rights acquisition request further carries a device identifier of a second smart device; and
   upon acquiring the first device group, the method further comprises:
   checking whether the first device group comprises a device identifier that is the same as the device identifier of the second smart device; and
   when the first device group comprises a device identifier that is the same as the device identifier of the second smart device, determining that the first smart device has management rights on the smart devices in the first device group.

3. The method according to claim 1, wherein prior to the acquiring a first device group from a corresponding relationship between location information and device groups, the method further comprises:
   receiving identifier information sent from a plurality of smart devices, the identifier information at least comprising location information and device identifiers;
   placing the plurality of smart devices into different device groups according to differences of the location information; and
   storing a corresponding relationship among device identifiers, location information and device groups.

4. The method according to claim 1, wherein upon the sending an authorization message to the first smart device and the smart devices in the first device group, the method further comprises:
   receiving a location update message sent from a third smart device, the third smart device being any smart device in the first device group, the location update message being configured to notify that location information of the third smart device is changed from the first location information to second location information; and
   changing, according to the location update message, a device group to which the third smart device pertains from the first device group to a second device group, location information corresponding to the second device group being the second location information.

5. The method according to claim 4, wherein upon the changing, according to the location update message, a device group to which the third smart device pertains from the first device group to a second device group, the method further comprises:
   sending a notification message to the first smart device, the notification message being configured to notify the first smart device to delete the third smart device from the first device group.

6. The method according to claim 1, wherein the method further comprises:
   setting a management password for the management account of the first device group.

7. The method according to claim 1, further comprising:
   sending a rights acquisition request to a server, the rights acquisition request at least carrying a login account and first location information of a first smart device, whereupon the server acquires a first device group from a corresponding relationship between location information and device groups according to the first location information, and when determining that the first smart device has management rights on smart devices in the first device group, sets the login account of the first smart device as a management account of the first device group;
   receiving an authorization message sent from the server, the authorization message being configured to notify that the management account of the first device group is the login account of the first smart device; and
   managing the smart devices in the first device group using the login account of the first smart device.

8. The method according to claim 7, wherein upon the managing the smart devices in the first device group according to the login account of the first smart device, the method further comprises:

receiving a notification message sent from the server, the notification message being sent when the server changes a device group to which a third smart device pertains from the first device group to a second device group, the third smart device being any smart device in the first device group; and deleting the third smart device from the first device group based on the received notification message.

9. An apparatus for setting a smart device management account, comprising:

one or more processors;

a non-transitory computer readable storage accessible to the one or more processors; and instructions stored in the non-transitory computer readable storage and being configured to be executed by the one or more processors, the instructions causing the one or more processors to perform acts comprising:

receiving a rights acquisition request sent from a first smart device, the rights acquisition request at least carrying a login account and first location information of the first smart device;

acquiring a first device group from a corresponding relationship between location information and device groups according to the first location information;

when determining that the first smart device has management rights on smart devices in the first device group, setting the login account of the first smart device as a management account of the first device group; and sending an authorization message to the first smart device and the smart devices in the first device group, the authorization message being configured to notify that the management account of the first device group is the login account of the first smart device, such that the first smart device and the smart devices in the first device group manage the smart devices in the first device group according to the login account of the first smart device, wherein the rights acquisition request further carries a device identifier of the first smart device; and wherein the acts further comprise:

determining, according to the device identifier of the first smart device and a prestored corresponding relationship between device identifiers and device groups, whether the first smart device pertains to the first device group; and when the first smart device pertains to the first device group, determining that the first smart device has management rights on the smart devices in the first device group.

10. The apparatus according to claim 9, wherein the rights acquisition request further carries a device identifier of a second smart device; and wherein the acts further comprise:

checking whether the first device group comprises a device identifier that is the same as the device identifier of the second smart device; and when the first device group comprises a device identifier that is the same as the device identifier of the second smart device, determining that the first smart device has management rights on the smart devices in the first device group.

11. The apparatus according to claim 9, wherein prior to the acquiring a first device group from a corresponding relationship between location information and device groups, the acts further comprise:

receiving identifier information sent from a plurality of smart devices, the identifier information at least comprising location information and device identifiers;

placing the plurality of smart devices into different device groups according to differences of the location information; and storing a corresponding relationship among device identifiers, location information and device groups.

12. The apparatus according to claim 9, wherein upon the sending an authorization message to the first smart device and the smart devices in the first device group, the acts further comprise:

receiving a location update message sent from a third smart device, the third smart device being any smart device in the first device group, the location update message being configured to notify that location information of the third smart device is changed from the first location information to second location information; and changing, according to the location update message, a device group to which the third smart device pertains from the first device group to a second device group, location information corresponding to the second device group being the second location information.

13. The apparatus according to claim 12, wherein upon the changing, according to the location update message, a device group to which the third smart device pertains from the first device group to a second device group, the acts further comprise:

sending a notification message to the first smart device, the notification message being configured to notify the first smart device to delete the third smart device from the first device group.

14. The apparatus according to claim 9, wherein the acts further comprise:

setting a management password for the management account of the first device group.

15. An apparatus for setting a smart device management account, comprising:

one or more processors;

a non-transitory computer readable storage accessible to the one or more processors; and instructions stored in the non-transitory computer readable storage and being configured to be executed by the one or more processors, the instructions causing the one or more processors to perform acts comprising:

sending a rights acquisition request to a server, the rights acquisition request at least carrying a login account and first location information of a first smart device, whereupon the server acquires a first device group from a corresponding relationship between location information and device groups according to the first location information, and when determining that the first smart device has management rights on smart devices in the first device group, sets the login account of the first smart device as a management account of the first device group;

receiving an authorization message sent from the server, the authorization message being configured to notify that the management account of the first device group is the login account of the first smart device; and managing the smart devices in the first device group using the login account of the first smart device;

wherein the rights acquisition request further carries a device identifier of the first smart device; and wherein the acts further comprise:

determining, according to the device identifier of the first smart device and a prestored corresponding relationship between device identifiers and device groups, whether the first smart device pertains to the first device group; and when the first smart device pertains to the first device group, determining that the first smart device has management rights on the smart devices in the first device group.

16. The apparatus according to claim 15, wherein upon the managing the smart devices in the first device group according to the login account of the first smart device, the acts further comprise:

receiving a notification message sent from the server, the notification message being sent when the server changes a device group to which a third smart device pertains from the first device group to a second device group, the third smart device being any smart device in the first device group; and deleting the third smart device from the first device group based on the received notification message.

\* \* \* \* \*